United States Patent Office 2,901,342
Patented Aug. 25, 1959

2,901,342

PURIFICATION OF INDIUM

Willem Jan Siemons, Landenburg, Pa., assignor to E. I. du Pont de Nemours and Company, Wilmington, Del., a corporation of Delaware No Drawing. Application November 29, 1956
Serial No. 624,964

3 Claims. (Cl. 75—84)

The present invention relates to the purification of indium and more specifically to the removal of zinc from indium metal.

Compounds of indium, in particular the antimonide and the arsenside are semi-conducting materials, and development of uses for these materials in electric and electronics fields, e.g., in transistors, is receiving considerable study at the present time. It is anticipated that many new and important uses for these and other indium compounds will be found in the near future.

In order to function properly in such known and anticipated electric and electronic applications, the compounds must be of an extremely high degree of purity, the impurities, particularly certain specific metallic impurities, not being present in amounts greater than a few parts per million of the compound.

Among other metals, zinc has been found to be a particularly troublesome impurity in said semi-conductor materials, and it has been found (T. C. Harmon, Journal of Electrochemical Soc. 103, 2, 128–131) that in indium antimonide for semi-conducting use, the source of this zinc contamination was the indium rather than the antimony. Thus it is seen to be highly desirable to have a means of purification for the indium metal to be used in the manufacture of these semi-conducting indium compounds. It has been stated that fractional electroplating is the most effective and the most practical method of removing zinc from indium; this process, however, is both cumbersome and difficult to control. The chemicals used for the electroplating bath have to be of very high purity since they in turn can introduce impurities into the metal. Also, the electroplating process entails the loss of about 20% of the total amount of indium being refined. It can, therefore, be stated that, up to the present time, no completely satisfactory method for the removal of zinc from indium has been known.

Since almost every process for obtaining indium metal employs zinc or zinc ores in some form, either as a mineral source or in the metallurgical procedures used to obtain the indium, it is inevitable that indium as produced from its ores should contain considerable amounts of zinc as an impurity. Impurities other than zinc will also be carried over to some degree from the ore to the indium metal.

One object of my invention is to provide a method by which indium may be purified. Another object relates to the purification of indium whereby to increase its utility for applications where a high degree of indium purity is required, for example, in the preparation from indium of semi-conducting crystalline materials for use in electronic equipment.

In general, my invention involves the preferential oxidation of metal impurities present in indium metal, and comprises the steps of melting the indium, subjecting the melt to the action of oxygen for an oxygen-containing gas whereby to convert the contaminating metals to oxides, and removing the oxides from the indium, preferably after solidifying the indium.

Specifically, my invention comprises the preferential oxidation of zinc found as an impurity in indium metal, the segregation of the oxide thus formed, and its removal from the surface of the indium metal.

The desired preferential oxidation of the metal impurities in indium can be carried out during the application of zone refining procedures, in which the indium metal to be refined is exposed to oxygen or a partial pressure of oxygen; or the preferential oxidation may be carried out by melting indium in a suitable crucible, and exposing the melted metal to oxygen or a partial pressure of oxygen with gentle stirring.

To more completely illustrate the operation of my invention, the following examples are given. These examples are intended to be illustrative only, and should not be considered as in limitation of my invention. Other methods of carrying out the details of the invention are possible and, therefore, I intend that my invention should be limited only as set forth in the claims. Parts, proportions and percentages given in the examples as well as elsewhere throughout this specification are by weight unless otherwise specified.

*Example I*

A rod of indium weighing 26.00 grams and containing 400 p.p.m. (parts per million) of metallic zinc as determined by emission spectroscopy was placed in a silica boat approximately 300 mm. long and 4 mm. wide. The rod was held exposed to a stream of helium containing 0.01% oxygen and was zone refined under these conditions:

A molten zone 10 mm. in length was moved through the ingot at speeds as follows:

9 passes were made through the ingot at the rate of 21 cm./hr.

3 passes were made at 10.5 cm./hr.

12 passes were made at 6 cm./hr.

During the above zone refining a thin gray, predominantly zinc oxide, coating appeared on the ingot, and, following each 6 passes of the molten zone, the ingot was cooled to about 40° C. and the coating removed by washing the ingot in concentrated hydrochloric acid. After the final washing with hydrochloric acid, the cleaned ingot was washed with water, rinsed with methanol, and dried in a stream of nitrogen.

The resulting ingot was analyzed by emission spectroscopy at 4 equally spaced places along the length of the ingot. In each case, the zinc concentration was below the spectroscopically detectable limit of about 50 p.p.m. There was no appreciable detectable loss in the weight of the indium content of the bar as a result of the above treatment.

*Example II*

In an alternative method of operation, a sample of indium metal weighing 100 grams and containing 500 p.p.m. metallic zinc was placed in a silica crucible. The indium was exposed to a stream of argon containing 0.1% oxygen and heated to 160° C. for 6 hours. During this heating, the metal was stirred gently with a silica stirrer. After solidification of the melt, the gray layer of material which had formed on the surface of the melt was removed by polishing the metal mass, and the indium metal was tested for the presence of zinc. The zinc remaining in the indium was found to be below the spectroscopically detectable limit of approximately 50 p.p.m. The original weight of the indium was found after the above treatment to be unchanged except for removal of the zinc and removal of at most a small fraction of 1% of indium.

*Example III*

A sample of indium weighing 100 g. and containing 400 p.p.m. metallic zinc was treated in a silica crucible according to the procedure of Example II, except that a stream of air was used as the oxidant. The melted indium was held exposed to the atmosphere of air at 180° C. for one hour with gentle stirring. After solidification of the melt, the gray layer of molten material which had formed on the surface was removed by washing in hydrochloric acid, followed by washing with water and rinsing with methanol. It was found that the zinc concentration of the metal had been lowered below the spectroscopically detectable limit of 50 p.p.m. with a loss of less than 1% of the weight of the indium metal.

The preferred range of metallic zinc in the starting indium metal treated in accordance with this invention is from 100–1000 p.p.m. and more specifically, 100–500 p.p.m. in order readily to attain the very high degree of purification of the indium necessary to meet the exacting requirements of the electrical and electronics arts. However, indium containing more than 1000 p.p.m. of metallic zinc can be converted with benefit to a product of higher purity by the practice of the invention.

As is shown by the examples described above, I have found that an inert gas stream containing a low percentage of oxygen will satisfactorily oxidize the zinc impurity in indium metal; or a stream of air may be used as the oxidant. Alternatively, my invention anticipates the employment of pure oxygen to react with the zinc impurity in the indium, and it may be employed to preferentially oxidize the zinc impurity without a resultant excessive loss of indium from oxidation of the metal.

The temperature of treatment of the molten metal may be selected over a wide range, but will normally lie between 156.4° C. (the melting point of indium) and 250° C. Likewise, the time of treatment is subject to a considerable range of selection but will ordinarily be from a few minutes up to 9 hours, a shorter time of treatment being used with higher temperatures or with higher concentrations of oxygen in the atmosphere surrounding the metal. Time and temperature will be selected according to the degree of purity desired and the optimum results as determined by the economy of the operation.

While hydrochloric acid, particularly in high concentration, has been selected as an effective agent for removing the formed oxides from the indium, other mineral acids and other suitable media for dissolving the oxides of the contaminating metals may be used. Also, where the oxides are removed by physical means, after solidification, any suitable polishing or other abrasive agents may be used. The zinc oxide travels to the surface of the molten mass during treatment as a separate phase, but solidification of the treated mass is preferred prior to removal of the contaminating oxides because of the ease of effecting removal of the oxide film from the solid metal.

By the practice of the present invention, the zinc content of indium metal can be completely removed by oxidation, with no substantial loss in indium content. This discovery of the preferential oxidation of zinc and the simplicity and ease of control of the reaction and of the removal of the zinc impurities, enables the ready and economical production of indium of a high degree of purity. Indium produced by this invention exhibits greatly improved properties particularly when applied to the production of indium compounds used as semi-conductors and to other uses where a high degree of metal purity is required.

I claim as my invention:

1. A process for the purification of metallic indium containing up to 1000 parts per million of metallic zinc as an impurity, which comprises exposing said indium in the molten state at a temperature between 156.4° C.–250° C. to an oxygen-containing atmosphere whereby to effect the preferential oxidation of zinc contained therein, solidifying the melt and removing from the indium the zinc oxide so formed.

2. A process for the purification of metallic indium containing up to 1000 parts per million of metallic zinc as an impurity, which comprises exposing said indium in the molten state at a temperature between 156.4° C.–250° C. to an atmosphere consisting essentially of inert gases containing at least 0.01% oxygen to effect the preferential oxidation of zinc contained in said indium and removing the zinc oxide so formed from the surface of the metal.

3. A process for the purification of metallic indium containing up to 1000 parts per million of metallic zinc as an impurity, which comprises exposing said indium in the molten state to an atmosphere consisting essentially of inert gases containing at least 0.01% oxygen to effect the preferential oxidation of zinc contained in said indium, at a temperature up to 250° C. and for a time up to 9 hours, and removing the zinc oxide so formed from the surface of the metal.

References Cited in the file of this patent

FOREIGN PATENTS 617,350     Great Britain _____ Feb. 4, 1949

OTHER REFERENCES

Hampel: "Rare Metals Handbook," publ. 1954 by Reinhold Publishing Corp., N.Y., p. 195.